United States Patent
Kirk et al.

(10) Patent No.: US 9,305,080 B2
(45) Date of Patent: Apr. 5, 2016

(54) ACCELERATING QUERIES USING DELAYED VALUE PROJECTION OF ENUMERATED STORAGE

(75) Inventors: Steven A. Kirk, Chelmsford, MA (US);
David E. Walrath, Stow, MA (US);
Fang-Ying Yen, Bedford, MA (US);
Roger D. MacNicol, Hollis, NH (US)

(73) Assignee: SYBASE, INC., Dublin, CA (US)

( * ) Notice: Subject to any disclaimer, the term of this patent is extended or adjusted under 35 U.S.C. 154(b) by 1021 days.

(21) Appl. No.: 11/646,610

(22) Filed: Dec. 28, 2006

(65) Prior Publication Data

US 2008/0162414 A1    Jul. 3, 2008

(51) Int. Cl.
*G06F 7/00* (2006.01)
*G06F 17/30* (2006.01)

(52) U.S. Cl.
CPC .................. *G06F 17/30675* (2013.01)

(58) Field of Classification Search
None
See application file for complete search history.

(56) References Cited

U.S. PATENT DOCUMENTS

| | | | |
|---|---|---|---|
| 6,823,329 B2 | 11/2004 | Kirk et al. | |
| 6,879,976 B1 | 4/2005 | Brookler et al. | |
| 6,907,414 B1* | 6/2005 | Parnell | 706/47 |
| 7,058,631 B1 | 6/2006 | Pal | |
| 2003/0078928 A1* | 4/2003 | Dorosario et al. | 707/10 |
| 2005/0240392 A1* | 10/2005 | Munro et al. | 704/8 |
| 2005/0283388 A1* | 12/2005 | Eberwine et al. | 707/3 |
| 2008/0059492 A1* | 3/2008 | Tarin | 707/100 |

OTHER PUBLICATIONS

International Search Report and Written Opinion for International Application No. PCT/US07/25931 mailed Jun. 5, 2008, 6 pgs.
Kirk et al., "Accelerating Queries Using Secondary Semantic Column Enumeration" U.S. Appl. No. 11/646,614, filed Dec. 28, 2006.
Kirk et al., "Accelerating Queries Using Temporary Enumeration Representation" U.S. Appl. No. 11/646,579, filed Dec. 28, 2006.

* cited by examiner

*Primary Examiner* — Jau-Shya Meng
(74) *Attorney, Agent, or Firm* — Sterne Kessler Goldstein & Fox, P.L.L.C.

(57) ABSTRACT

A system, method, and computer program product for processing a database query are presented. Steps for identifying a table needed to resolve the query, creating an enumeration value, determining whether the enumeration value is semantically equivalent to data from a data field in the table, and using a temporary data structure to evaluate the query are disclosed.

19 Claims, 11 Drawing Sheets

FIG. 1

| CLIENT NO. | CONTACT | COMPANY |
|---|---|---|
| 0 | JOE | XYZ INC. |
| 1 | JOHN | ABC INC. |
| 2 | BOB | ABC INC. |
| 3 | RALPH | XYZ INC. |
| 4 | CINDY | DEF INC. |
| 5 | TOM | ABC INC. |
| 6 | ANN | JKL INC. |
| 7 | BOB | XYZ INC. |
| 8 | DEBBIE | ABC INC. |
| 9 | LOU | ABC INC. |

CLIENTS

| PERSISTENT ORDINAL | COLUMN VALUE | SECONDARY ORDERED ORDINAL |
|---|---|---|
| 1 | MALE | 2 |
| 2 | FEMALE | 1 |
| 3 | UNKNOWN | 3 |

| PERSISTENT ORDINAL | COLUMN VALUE | SECONDARY EQUIVALENCE ORDINAL |
|---|---|---|
| 1 | e | 1 |
| 2 | E | 1 |
| 3 | Ã | 2 |
| 4 | É | 1 |
| 5 | A | 2 |

| PERSISTENT ORDINAL | COLUMN VALUE | SECONDARY ORDERED EQUIVALENCE ORDINAL |
|---|---|---|
| 1 | e | 2 |
| 2 | Z | 3 |
| 3 | Ã | 1 |
| 4 | É | 2 |
| 5 | A | 1 |

| PERSISTENT ORDINAL: T. STATE | COLUMN VALUE |
|---|---|
| 1 | MA |
| 2 | NY |
| 3 | NH |
| 4 | VT |

700

| PERSISTENT ORDINAL: R. STATE | COLUMN VALUE | SECONDARY JOIN EQUIVALENCE ORDINAL |
|---|---|---|
| 1 | NH | 3 |
| 2 | MA | 1 |
| 3 | PA | 5 |

ACCELERATING QUERIES USING DELAYED VALUE PROJECTION OF ENUMERATED STORAGE

CROSS-REFERENCE TO RELATED APPLICATIONS

The present application is related to co-pending U.S. patent application Ser. No. 11/646,614, filed on Dec. 28, 2006 titled "Accelerating Queries Using Secondary Semantic Column Enumeration" and U.S. patent application Ser. No. 11/646,579, filed on Dec. 28, 2006 titled "Accelerating Queries Using Temporary Enumeration Representation".

BACKGROUND OF INVENTION

1. Field of the Invention

The present invention relates generally to databases and, more particularly, to optimization of database queries.

2. Description of the Background Art

Databases traditionally operate on data stored in tables through the use of queries. Queries may result in the performance of various calculations on the data in the database, such as sorting the data, grouping it, and comparing it. In order to perform these calculations, it is often necessary to create temporary data structures, such as sort or hash objects.

When performing calculations on sets of data where a table column is of a very large data type, data of that data type is propagated through the temporary data structures, increasing their size and consuming memory. Furthermore, operations performed on large data types may consume large amounts of processing resources given the amount of data that must be considered.

Accordingly, what is desired is an effective means for optimizing database queries on intensive space- and processor-consuming data types.

SUMMARY OF INVENTION

The invention includes a computer-implemented method for processing a database query, in accordance with an embodiment of the present invention. The method includes the step of identifying a table, wherein the table contains information needed in order to resolve the query, and wherein a column in the table is represented using enumeration values and a lookup-table to translate each of the enumeration values into original data values for the column. The method further includes the step of evaluating the query. The step of evaluating the query includes the steps of executing one or more processing steps, wherein the processing steps comprise operations on the original data values, determining if the enumeration values can be used instead of the original data values, and utilizing the enumeration values instead of the original data values in one or more of the one or more processing steps, if it is determined that the enumeration values can be used instead of the original data values.

The invention further includes a computer program product comprising a computer usable medium having computer program logic recorded thereon for enabling a processor to process a database query, in accordance with an embodiment of the present invention. The computer program logic includes an identifying means for enabling a processor to identify a table, wherein the table contains information needed in order to resolve the query, and wherein a column in the table is represented using enumeration values and a lookup-table to translate each of the enumeration values into original data values for the column. The computer program logic further includes an evaluating means for enabling a processor to evaluate the query. The evaluating means comprises an executing means for enabling a processor to execute one or more processing steps, wherein the processing steps comprise operations on the original data values, a determining means for enabling a processor to determine if the enumeration values can be used instead of the original data values, and utilizing means for enabling a processor to utilize the enumeration values instead of the original data values in one or more of the one or more processing steps, if it is determined that the enumeration values can be used instead of the original data values.

The invention additionally includes a system capable of processing a database query, in accordance with an embodiment of the present invention. The system includes a first module to identify a table, wherein the table contains information needed in order to resolve the query, and wherein a column in the table is represented using enumeration values and a lookup-table to translate each of the enumeration values into original data values for the column. The system further includes a second module to evaluate the query. The second module includes a third module to execute one or more processing steps, wherein the processing steps comprise operations on the original data values, a fourth module to determine if the enumeration values can be used instead of the original data values, and a fifth module to utilize the enumeration values instead of the original data values in one or more of the one or more processing steps, if it is determined that the enumeration values can be used instead of the original data values.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

1. Introduction

The following references statements and commands from the Structured Query Language (SQL). SQL is well known and is described in many publicly available documents, including "Information Technology—Database languages—SQL," published by the American National Standards Institute as American National Standard ANSI/ISO/IEC 9075: 1992, which is hereby incorporated by reference in its entirety.

Data stored in a database is commonly stored in the form of a row associated with a particular table. Each table and, accordingly, its constituent rows, comprise a number of columns. Furthermore, a column is traditionally associated with a particular data type (e.g., INT, CHAR(20), etc.). Certain data types, such as very long strings of characters, may consume large amounts of disk space when many rows of data exist within a table utilizing such a large data type for one or more of its columns.

Figure 1:
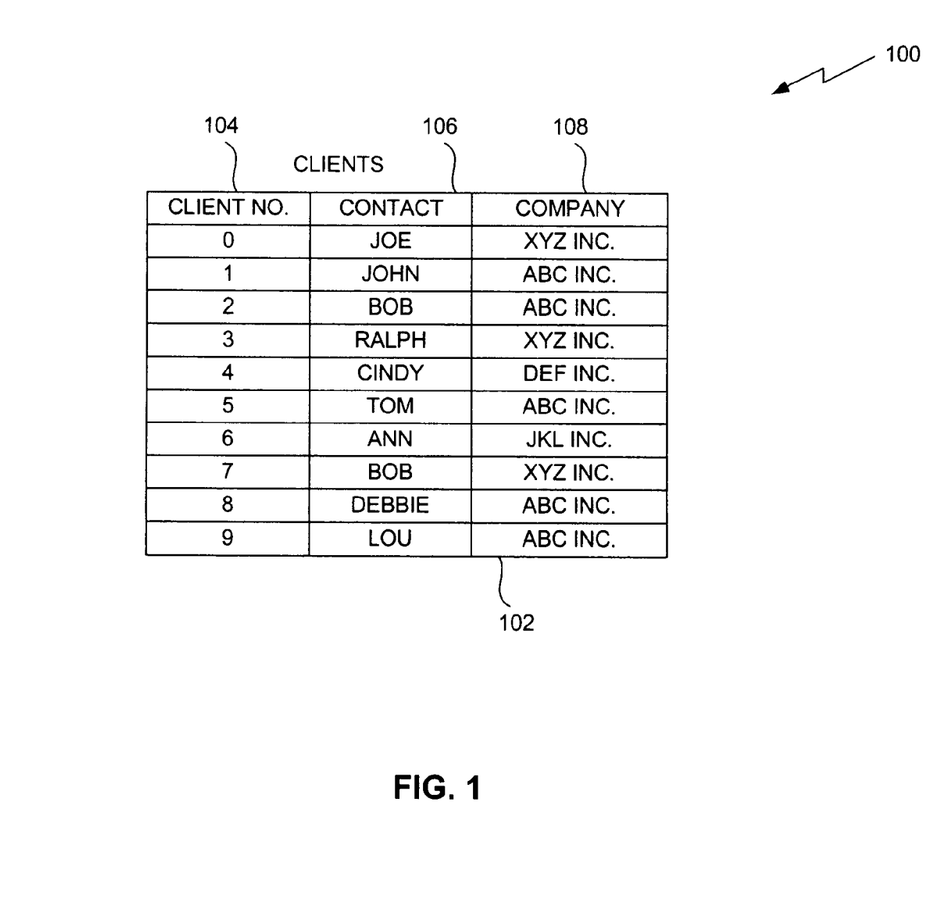
FIG. 1 illustrates an example table within a database, in accordance with an embodiment of the present invention.

Occasionally, data stored in a large data type column is present in more than one row. In such instances, it may be advantageous to utilize an enumerated index to improve the efficiency of data storage within the database, in accordance with an embodiment of the present invention. FIG. 1 illustrates an example database 100 comprising a table 102. Table 102 contains a client number column 104, a contact column 106, and a company column 108. The client number column 104 acts as a key to table 102, wherein the data value for column 104 in each row of table 102 is unique. The values in columns 106 and 108 need not be unique.

In this example, the ten rows in table 102 have only one of four possible values for the data in column 108, namely "ABC Inc.", "DEF Inc.", "JKL Inc.", or "XYZ Inc." Assuming that all company names in column 108 are expected to be at most 8 characters in size, column 108 is associated with a data type of CHAR(8), in accordance with an embodiment of the present invention. A character occupies a byte of data, and accordingly every row in table 102 utilizes 8 bytes of storage space for its company data in column 108, in accordance with an embodiment of the present invention. Over ten rows of data, as illustrated in FIG. 1, all of the data in column 108 occupies 80 bytes.

Figure 2:
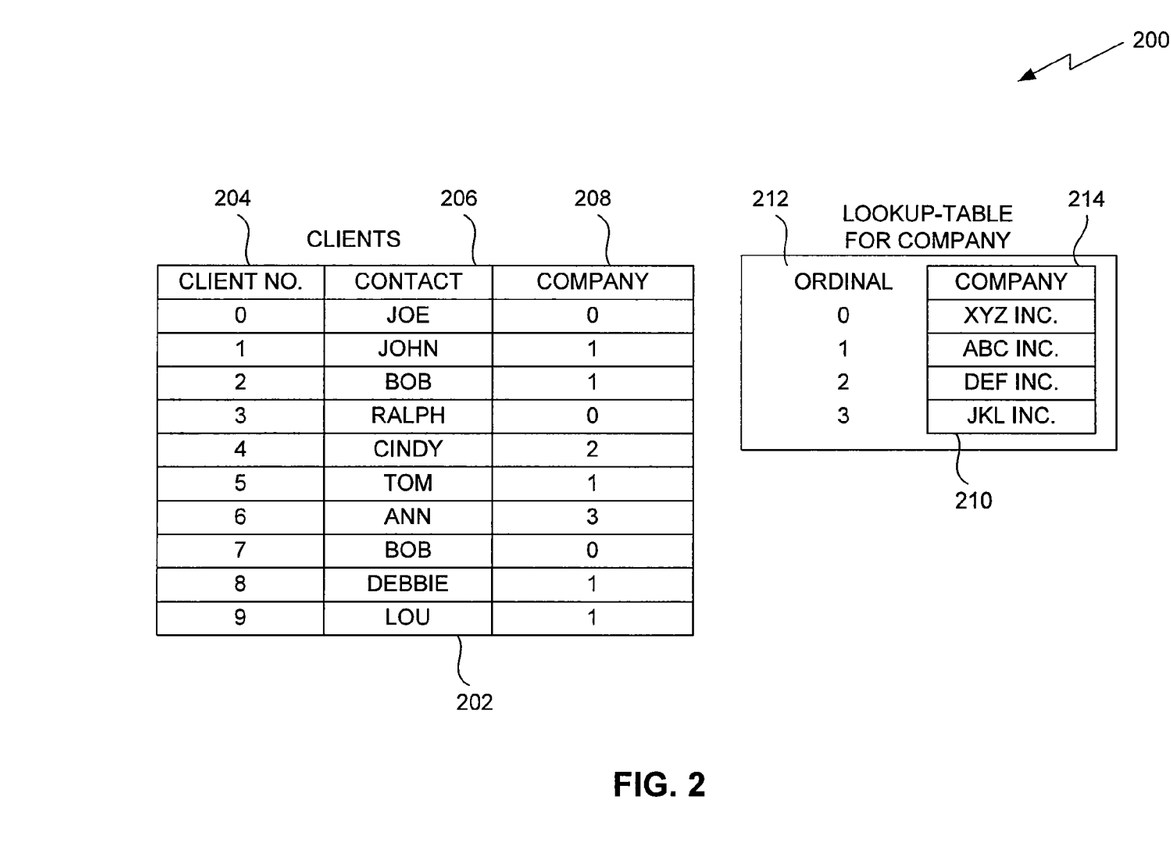
FIG. 2 illustrates an example table within a database using an enumerated index, in accordance with an embodiment of the present invention.

By using an enumerated index (also referred to as an "enumerated column" or "a column having enumerated storage"), it is possible to compress the storage of the data in column 108. In an enumerated index, all unique column data values are stored in an associative data structure, and the column data values are replaced with enumeration values that identify which unique data value is associated with each row of column 108, in accordance with an embodiment of the present invention. This associative data structure is referred to as the lookup-table, and any associative data structure may be used for the lookup-table. For the purposes of illustration, an array structure will be used for the enumeration lookup-table in the following examples, and, given an array, the enumeration values are each an ordinal which identifies the specific array element containing the appropriate column data value. FIG. 2 illustrates an example database 200, corresponding to example database 100 in FIG. 1, which utilizes an enumerated index. Table 202 similarly contains a client number column 204, a contact column 206, and a company column 208. In this example, however, the data contained in company column 208 is an enumeration value. Each enumeration value serves as an ordinal into the enumerated index's lookup-table 210. By matching the enumeration value from column 208 with an ordinal value from column 212, the actual company data 214 is obtained (the "cell value").

The ordinal value 212 can be represented by 2 bits of data in this example, as there are only four entries in lookup-table 210. In total, this approach consumes 20 bytes in order to store each of the four company names 214 which are 8 bytes each once and a further 20 bits for the entries in company column 208. Although this example utilizes a small data set, the optimization of resources is evident, and one skilled in the art will appreciate that greater efficiencies are achieved when operating on larger data sets in a similar manner.

Whenever the data from a row in table 202 is requested, the database will consult the enumerated index 210 to obtain the actual value for company column 208, and will return that value as part of the result. In a basic implementation of an enumerated index, any further processing on data in the company column 208 is performed using the character string, and no further usage of the enumeration value is made.

2. Delayed Value Projection

When manipulating tables through the use of queries, a database may need to evaluate the query by using a set of processing steps. These query processing steps often require the creation of temporary data structures such as hash tables or sorts to be able to complete their processing. Together, a set of these query processing steps provides a response to the query. In a database implementing an enumerated index as described above, data from columns utilizing the enumerated index is passed by value through these temporary data structures.

In accordance with an embodiment of the present invention, the conversion of an enumeration value from a column into a cell value is delayed as long as possible during the execution of a query in order to optimize the memory requirements of temporary data structures and processing requirements of comparison operations, a process termed "delayed value projection." In accordance with a further embodiment of the present invention, the enumeration value for a column used in an enumerated index is used in further processing by associating the enumeration value with an instance of an evaluable class. In accordance with an additional embodiment of the present invention, this evaluable class is termed an FPOrdinal.

An instance of an FPOrdinal is assigned a current value implicitly by a subsystem assigned to handle the projection of enumeration values in a manner similar to projecting values from traditional columns, in accordance with an embodiment of the present invention.

A second evaluable class, termed an FPValue, is defined as a class whose instances have an enumeration value as their input argument, which is used as an index to a lookup-table to find a column cell value corresponding to the enumeration value, in accordance with an embodiment of the present invention.

Figure 3:
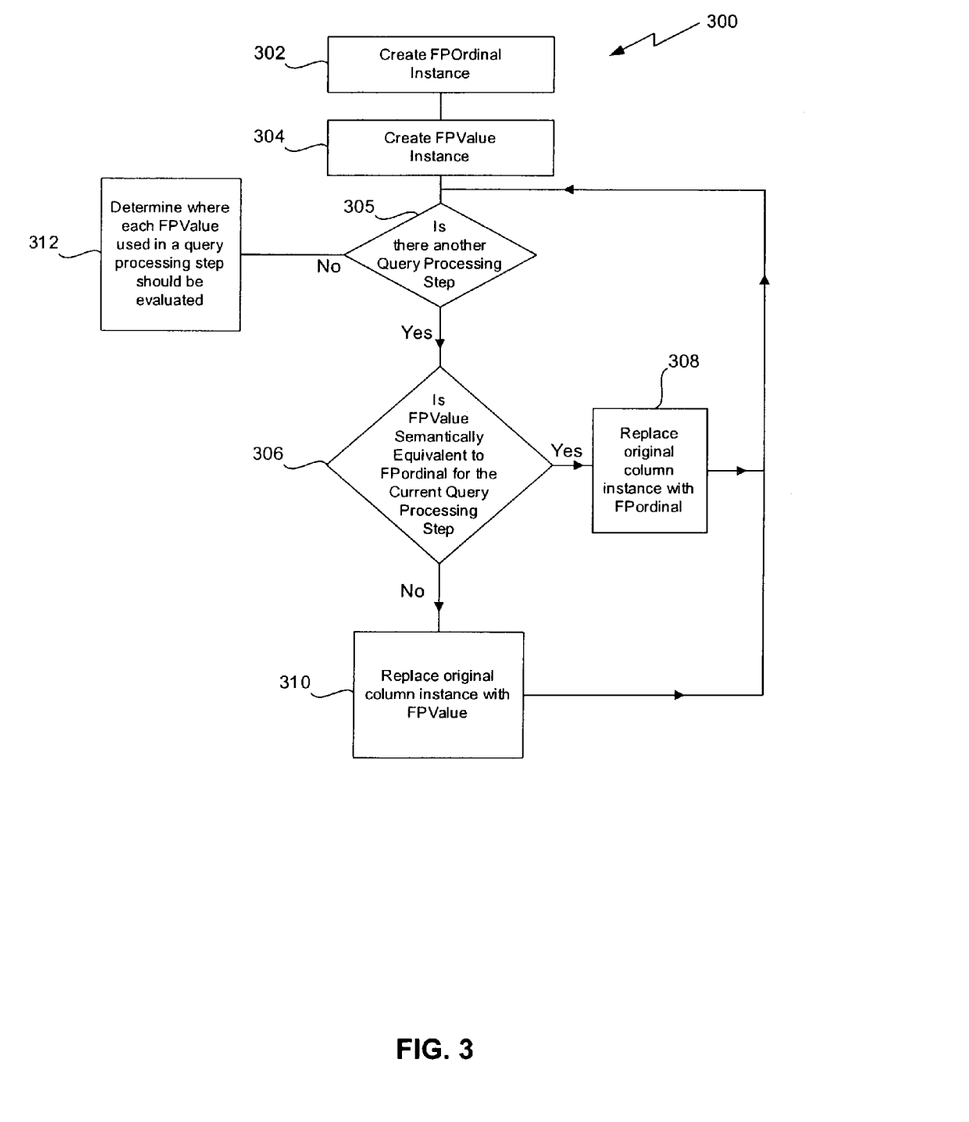
FIG. 3 is a flowchart illustrating the steps for performing delayed value projection, in accordance with an embodiment of the present invention.

FIG. 3 includes a flowchart 300 which illustrates the steps for performing delayed value projection, in accordance with an embodiment of the present invention. Flowchart 300 is discussed with continued reference to FIG. 2. At step 302, an instance of an FPOrdinal is created. The FPOrdinal instance corresponds to an enumeration value in column 208 in the example. At step 304, an FPValue instance is created, which corresponds to a value associated with an FPOrdinal. In the example, possible FPValues are shown in column 214.

At step 306, a determination is made as to whether the FPValue instance is semantically equivalent to its associated FPOrdinal for a specific processing step. This determination is dependent on the query being made, the type of query processing step, and the role of the column within that processing step. If a GROUP BY processing step is performed on the values of company column 208, such that all rows representing a particular company are grouped together, then it can be said that the FPValue is semantically equivalent to the FPOrdinal for the purpose of the GROUP BY processing step if that step will produce the same grouping results if it is performed using either the FPOrdinal value or the FPValue, in accordance with an embodiment of the present invention. Accordingly, at step 308, the original column instance is replaced with the FPOrdinal instance.

In order to perform a GROUP BY processing step on the values for company column 208, it would be necessary to compare the individual characters of the strings to determine whether they are the same string. The problem is exacerbated by strings with many common leading characters that are, in fact, different, resulting in many comparison operations before finding the dissimilarity. In accordance with an embodiment of the present invention, the FPOrdinal values can be used for comparison rather than the strings themselves, as in example table 202. Typically, an FPOrdinal will be of a much smaller data size than the data column it represents, and accordingly less space is needed to perform the comparison, and fewer processing resources are necessary to actually perform the comparison.

If the FPValue is determined not to be semantically equivalent to the FPOrdinal in step 306, then the original column instance is replaced with the FPValue, in accordance with an embodiment of the present invention. If, for example, a query was performed on table 202 which did a GROUP BY on the fifth character within a company name in the company column 208, then the FPOrdinal cannot be used and the actual column value is needed. Accordingly, the FPValue is used. As step 305 indicates, the determination at step 306 whether the enumeration values (i.e., the FPOrdinal) will be semantically equivalent to the column data values (i.e., the FPValue) must be done for each query processing step involving an enumerated column. The determination must be done separately for each query processing step because the determination will vary depending on the data type of the column data, the data type of the processing step, and on the role of the column within the processing step. At step 312, a determination is made, for each FPValue used within a query processing step, as to when the FPValue shall be evaluated. Step 312 occurs only when the column value from an FPValue is needed, such as, in the above example, when the substring search of the company name is actually going to be performed. This results in a smaller enumeration value being passed through any intermediate query processing steps before the actual value is needed. One skilled in the relevant art will appreciate that the steps in flowchart 300 may be repeated over a number of values, and are not necessarily performed in the order depicted.

3. Secondary Enumeration

The concept of delayed value projection can be extended through the use of secondary enumeration. A secondary enumeration is a mapping from a set of enumeration values to a dependent secondary set of enumeration values. This mapping is derived from the original column data values in such a way that the secondary enumeration values reflect some semantic property which is present in the column data but not in the column's enumeration values, in accordance with an embodiment of the present invention. The semantic properties which can be handled in this way include, for example, orderedness, equivalence, and the defining of a shared enumeration domain between multiple columns. Like the column enumeration, a secondary enumeration could use any associative data structure, but for the purposes of illustration an array structure will be used in the following examples.

In accordance with an embodiment of the present invention, the secondary enumeration is created only when needed and then discarded. In accordance with another embodiment of the present invention, the secondary enumeration is created the first time it is needed and then persistently maintained until the set of values in the column changes. In accordance with an additional embodiment of the present invention, the secondary enumeration is created the first time it is needed and then persistently maintained and updated whenever the set of values in the column changes. In accordance with a further embodiment of the present invention, the secondary enumeration is created at the same time as the column's enumeration and persistently maintained through all changes. These secondary enumeration values, like the ordinals in the delayed value projection strategy, flow through intermediate data structures, such as hashes and sorts, and provides some additional information to assist in resolving a query.

Figure 4:
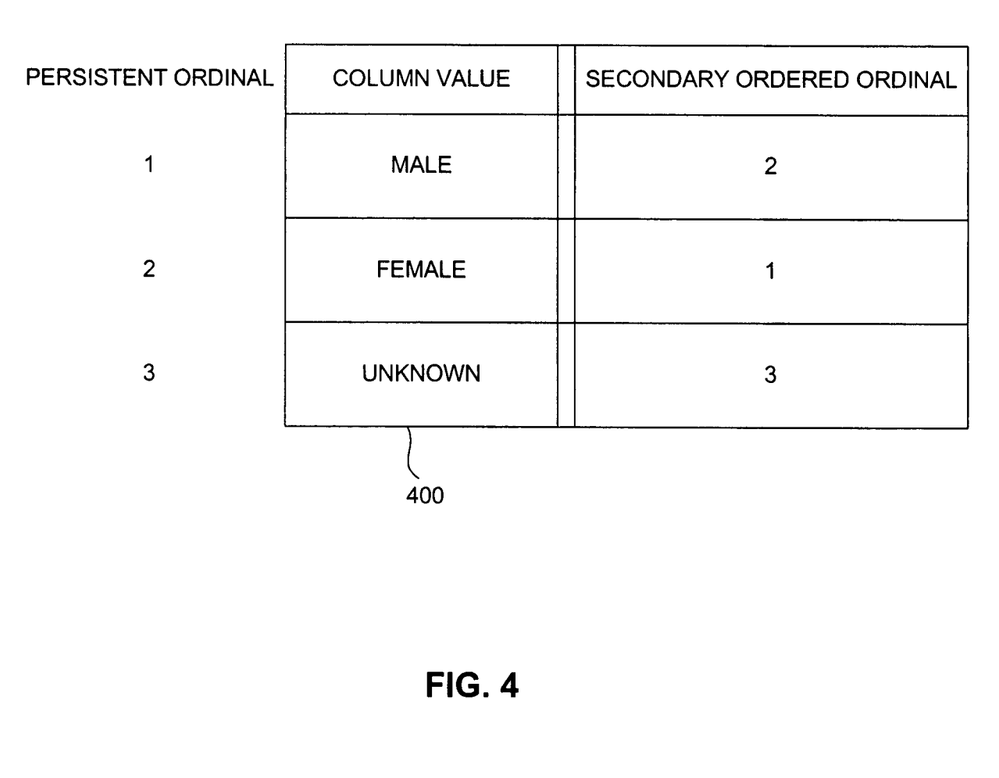
FIG. 4 illustrates a lookup-table with secondary enumeration, in accordance with an embodiment of the present invention.

In accordance with an embodiment of the present invention, a secondary enumeration can be used as a secondary ordered ordinal. FIG. 4 illustrates an example lookup-table 400 of a mapping between column ordinals, column values, and secondary ordered ordinals. In table 400, the column ordinals cannot be used as an ordering key because the column values are not in sorted order. This condition occurs when an ORDER BY processing step is performed on a column whose data type does not require conditioning, such as a DATE or INTEGER type. A second ordinal set, the secondary ordered ordinals, is created in order to map each column enumeration value into a second enumeration value in the second ordinal set, where the second enumeration values are ordered in the same manner as the result of performing the ORDER BY processing step on the column values, in accordance with an embodiment of the present invention. This form of secondary enumeration results in sort comparisons being done on an enumerated data type which is less expensive to compare than other data types, and also provides space savings within any temporary sort data structures.

Figure 5:
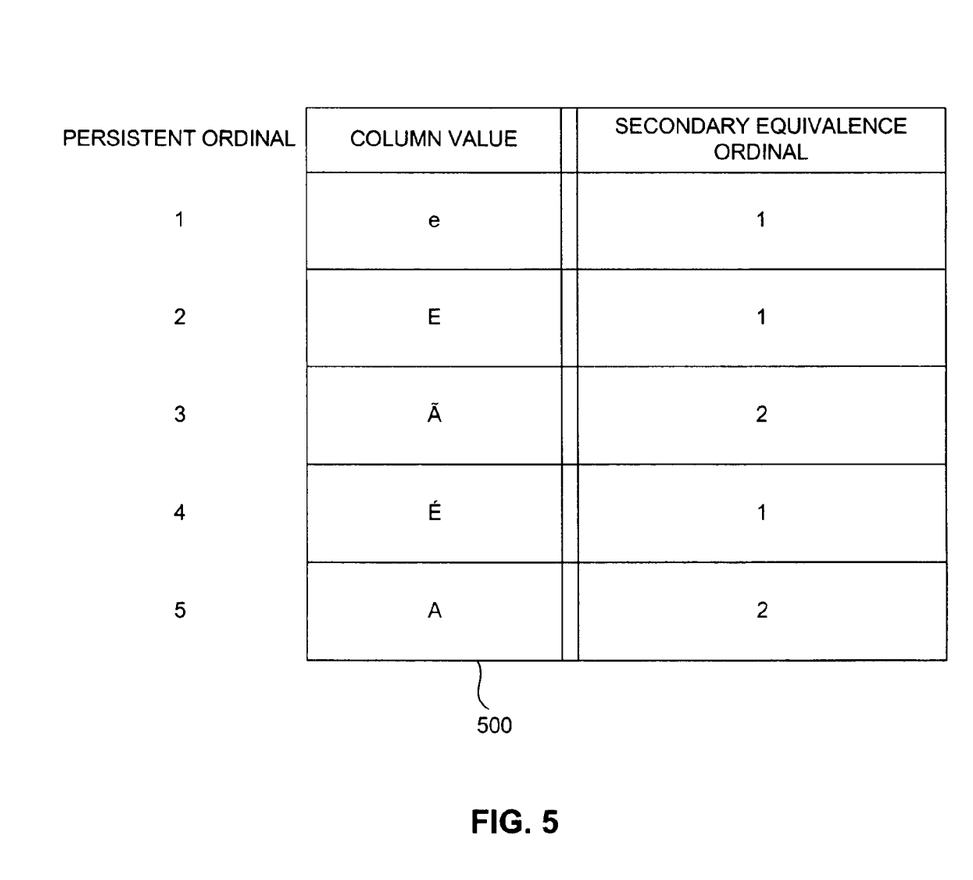
FIG. 5 illustrates a lookup-table with secondary equivalence enumeration, in accordance with an embodiment of the present invention.

In accordance with an additional embodiment of the present invention, a secondary enumeration can be used as a secondary equivalence ordinal. FIG. 5 illustrates an example lookup-table 500 of a mapping between column ordinals, column values, and secondary equivalence ordinals. In table 500, if a column's data type requires conditioning (e.g., a string column in a case insensitive database using an ISO-LATIN collation), then performing a GROUP BY processing step on the column ordinal will not have the same semantics as performing the GROUP BY processing step on the column. A second ordinal set, the secondary equivalence ordinals, is created in order to map each column enumeration value into a second enumeration value in the second ordinal set, where the second enumeration values are created such that all equivalent column values have the same secondary enumeration value, in accordance with an embodiment of the present invention. This form of secondary enumeration results in grouping being done on an enumerated data type which is less expensive to compare than other data types, and also provides space savings within any temporary data structures required by the grouping processing step.

Figure 6:
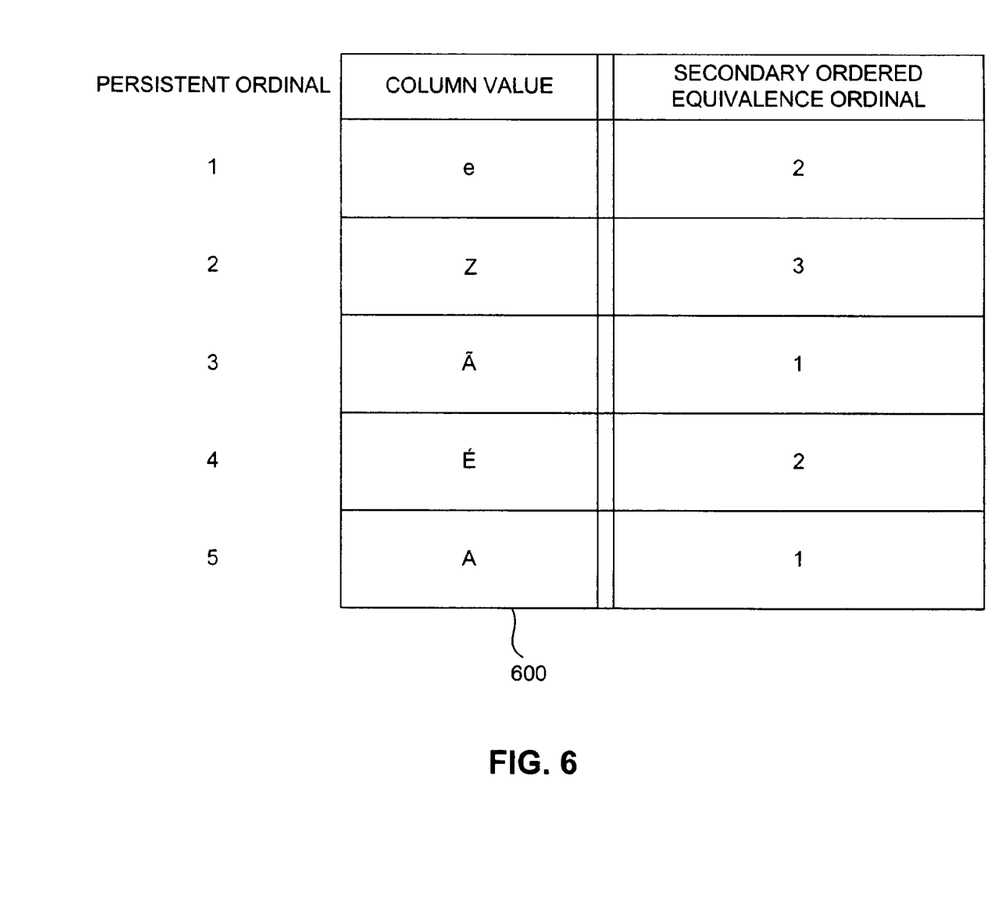
FIG. 6 illustrates a lookup-table with secondary ordered equivalence enumeration, in accordance with an embodiment of the present invention.

In accordance with a further embodiment of the present invention, a secondary enumeration can be used as a secondary ordered equivalence ordinal. FIG. 6 illustrates an example lookup-table 600 of a mapping between column ordinals, column values, and secondary ordered equivalence ordinals. In table 600, if the column's data type requires conditioning (e.g., a string column in a case insensitive database using an ISO-LATIN collation), then performing a ORDER BY processing step on the column ordinal will not have the same semantics as performing an ORDER BY processing step on the column because the column values in table 600 are not in sorted order and the ORDER BY processing step does not take into account that table 600 may contain multiple values which are not identical but must be treated as equivalent. A second ordinal set, the secondary ordered equivalence ordinals, is created in order to map each column enumeration value into a second enumeration value in the second ordinal set, where the second enumeration values are created such that all equivalent column values have the same secondary enumeration value, and further such that the second enumeration values are assigned to correspond to the sort order of the column values, in accordance with an embodiment of the present invention. This form of secondary enumeration results in grouping and sorting being done on an enumerated data type which is less expensive to compare than other data types, and also provides space savings within any temporary group or sort data structures.

Figure 7:
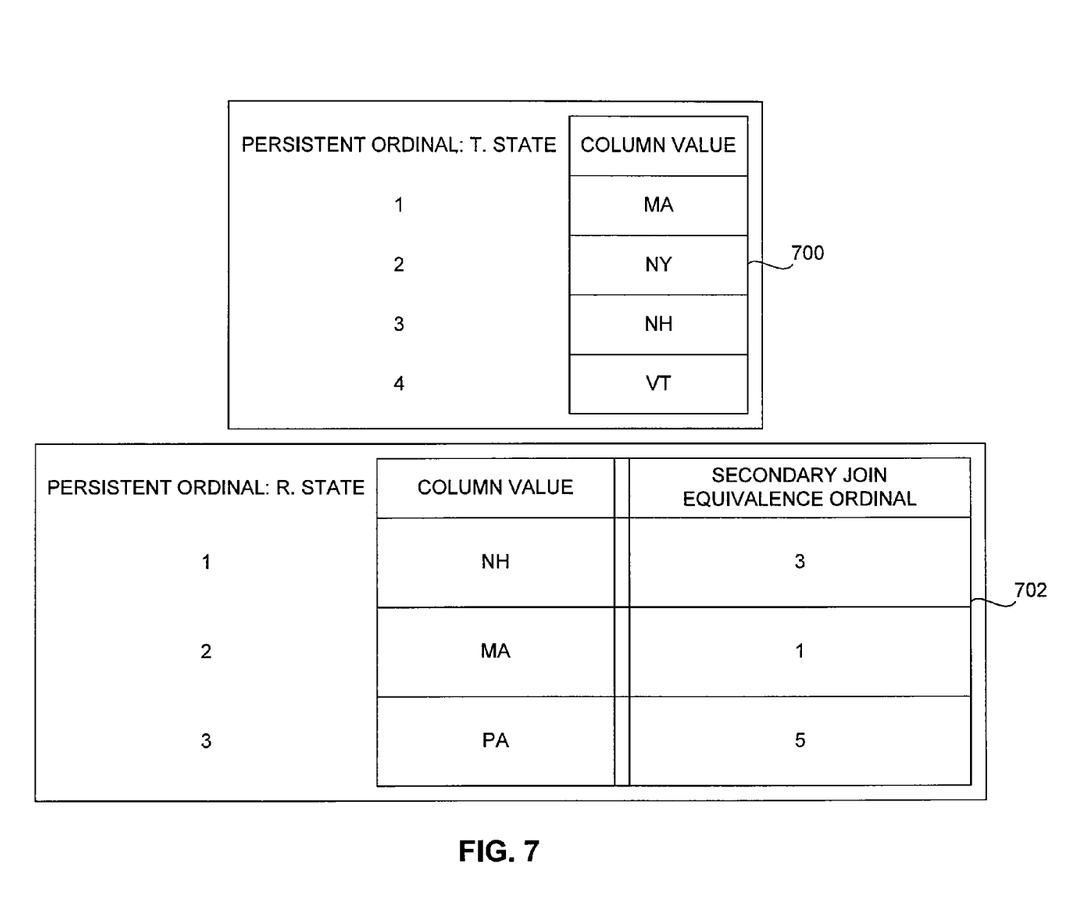
FIG. 7 illustrates a lookup-table with secondary join equivalence enumeration, in accordance with an embodiment of the present invention.

In accordance with another embodiment of the present invention, a secondary enumeration can be used as a secondary join equivalent ordinal. FIG. 7 illustrates an example lookup-table 702 of a mapping between column ordinals, column values, and secondary join equivalence ordinals. In this example, the column values in lookup-table 702 are joined to the column values in lookup-table 700. A secondary ordinal set is provided to lookup-table 702 in order to map each column value in table 702 to each column value in table 700, consistent with a join processing step, in accordance with an embodiment of the present invention. In accordance with a further embodiment of the present invention, the secondary ordinals are assigned to correspond to the column ordinals for the column values of table 700 to which the column value from table 702 corresponds. If a column value in table 702 has no corresponding column value in table 700, then an available secondary ordinal is assigned to the column value in table 700. This strategy creates a shared enumeration domain between the two columns which are equated in the join condition. This shared domain strategy can also be used when two enumerated columns from the same table are equated to each other. The strategy can also be used when a UNION query operation combines several enumerated columns by defining a set of secondary enumerations which merges the domains of all the matching columns. In addition, this strategy can be used in combination with the earlier strategies, so a sort-based join processing step where the join condition equates a pair of columns having a string data type in a case insensitive database could be evaluated using a secondary ordered equivalence enumeration on one column and a secondary ordered join equivalence enumeration on the second column. In each usage, the strategy improves query performance by reducing the costs of comparisons, and in some usages it will reduce the space required for temporary data structures.

Figure 8:
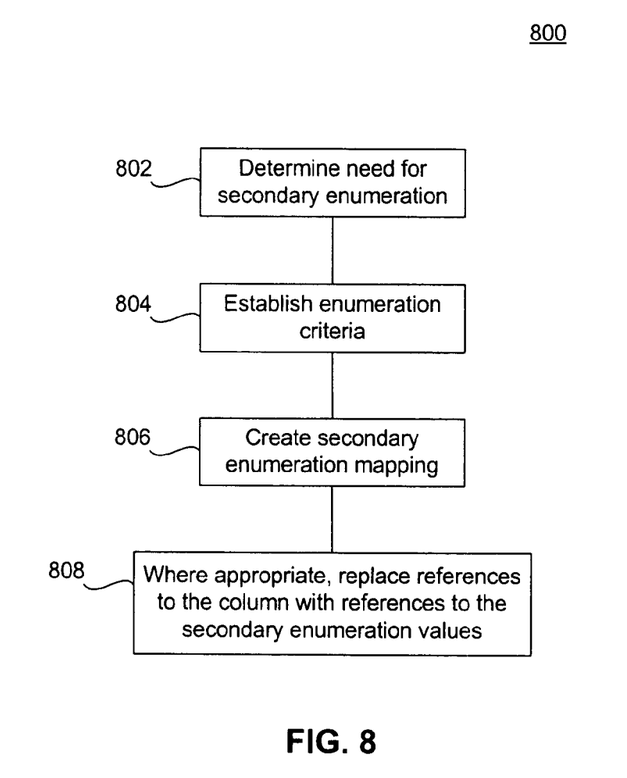
FIG. 8 is a flowchart illustrating the steps for performing secondary enumeration, in accordance with an embodiment of the present invention.

FIG. 8 includes a flowchart 800 which illustrates the steps by which a secondary enumeration is produced, in accordance with an embodiment of the present invention. At step 802, a determination is made that a secondary enumeration is needed. As previously disclosed, this determination is based on whether a column's data type requires conditioning, in accordance with an embodiment of the present invention. In accordance with a further embodiment of the present invention, the determination is based on whether a column ordinal is semantically equivalent to a column value it represents. One skilled in the relevant arts will appreciate that additional uses for secondary ordered equivalence ordinals are possible, and the aforementioned examples are provided solely for the purposes of illustration, and not limitation.

At step 804, the criteria for the secondary enumeration is established. In accordance with an embodiment of the present invention, the criteria is consistent with a particular sort order and requires that every ordinal in the secondary enumeration be unique. In accordance with an additional embodiment of the present invention, the criteria is consistent with identifying equivalent column values with like ordinals in the secondary enumeration. One skilled in the relevant arts will appreciate that additional criteria for secondary enumeration are possible, and the aforementioned examples are provided solely for the purposes of illustration, and not limitation.

At step 806, a mapping using the secondary enumeration is established. In accordance with an embodiment of the present invention, the mapping is made in the form of a lookup-table, mapping a column ordinal and a column value to a particular ordinal in the secondary enumeration. At step 808, references to the column ordinal are replaced with references to the secondary enumeration values, where appropriate.

Figure 9:
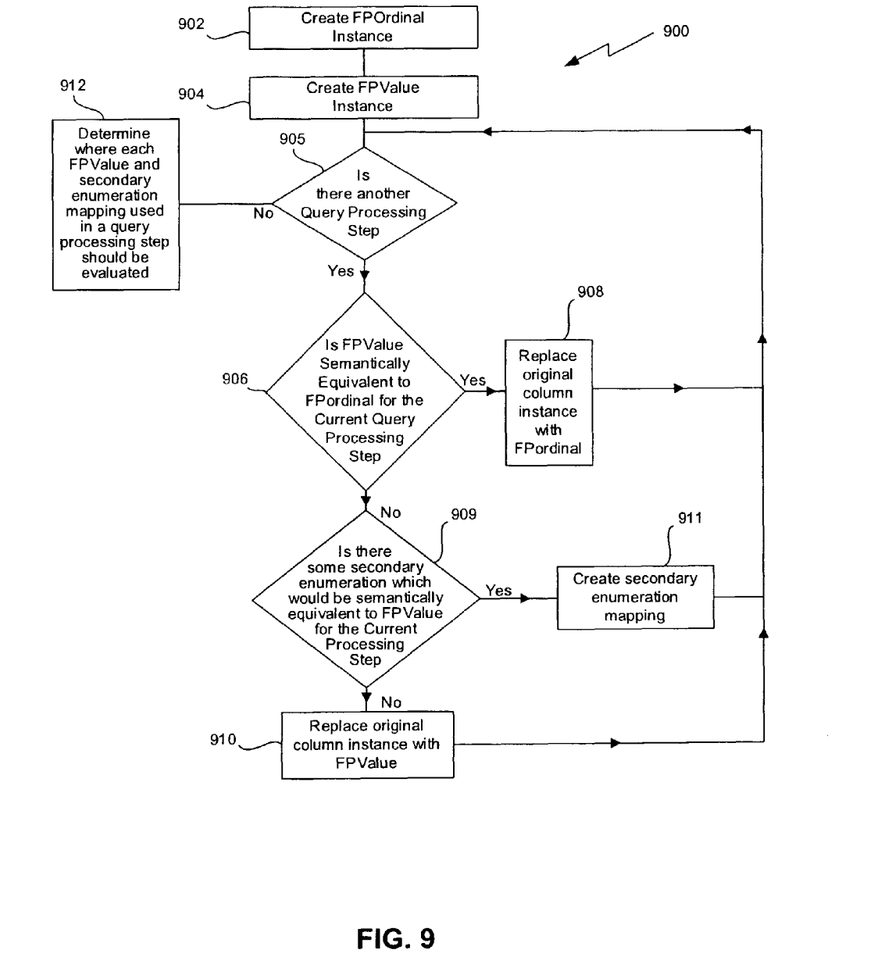
FIG. 9 is a flowchart illustrating the steps for performing secondary enumeration in conjunction with delayed value projection, in accordance with an embodiment of the present invention.

FIG. 9 includes a flowchart 900 which illustrates the steps by which the secondary enumeration illustrated in flowchart 800 in FIG. 8 is used in conjunction with delayed value projection as illustrated in flowchart 300 in FIG. 3, in accordance with an embodiment of the present invention. If, at step 906, a determination is made that an FPValue is not semantically equivalent to an FPOrdinal for the current query processing step, then at step 909 a determination is made whether a secondary enumeration is possible, wherein the secondary enumeration is semantically equivalent to the FPValue for the current processing step. If so, the secondary enumeration mapping, as shown in flowchart 800 in FIG. 8, is created at step 911. Otherwise, processing continues at step 910 by means previously discussed with reference to flowchart 300 in Section 2. At step 912, aside from determining when to evaluate each FPValue in a query processing step, a determination is made as to when to evaluate the secondary enumeration mapping as well.

4. Temporary Enumeration

In accordance with an embodiment of the present invention, the enumeration of column values as previously disclosed is temporary. If a table or the result of any query processing step has a small number of rows, then an in-memory temporary lookup-table is created for each column or other value expression used in that query processing step. Similarly, if a query contains a condition on a column or value expression restricting it to a very small set of distinct values, then an in-memory temporary lookup-table is created for that one column or value expression. Just as for an enumerated index, any associative data structure may be used for the temporary enumeration, but for the purposes of illustration an array structure is used in the following examples.

Creating the temporary lookup-tables results in some amount of computational and resource expenditure, and empirical determinations are made of the appropriate threshold based on the number of distinct values, available resources, and other common optimization factors for each column or value expression, in accordance with an embodiment of the present invention.

As with delayed value projection, temporary enumeration provides space savings within temporary intermediate results structures and faster comparisons for query operations. One skilled in the relevant art will appreciate that the aforementioned techniques may be used in combination with temporary enumeration to provide further improvements.

Figure 10:
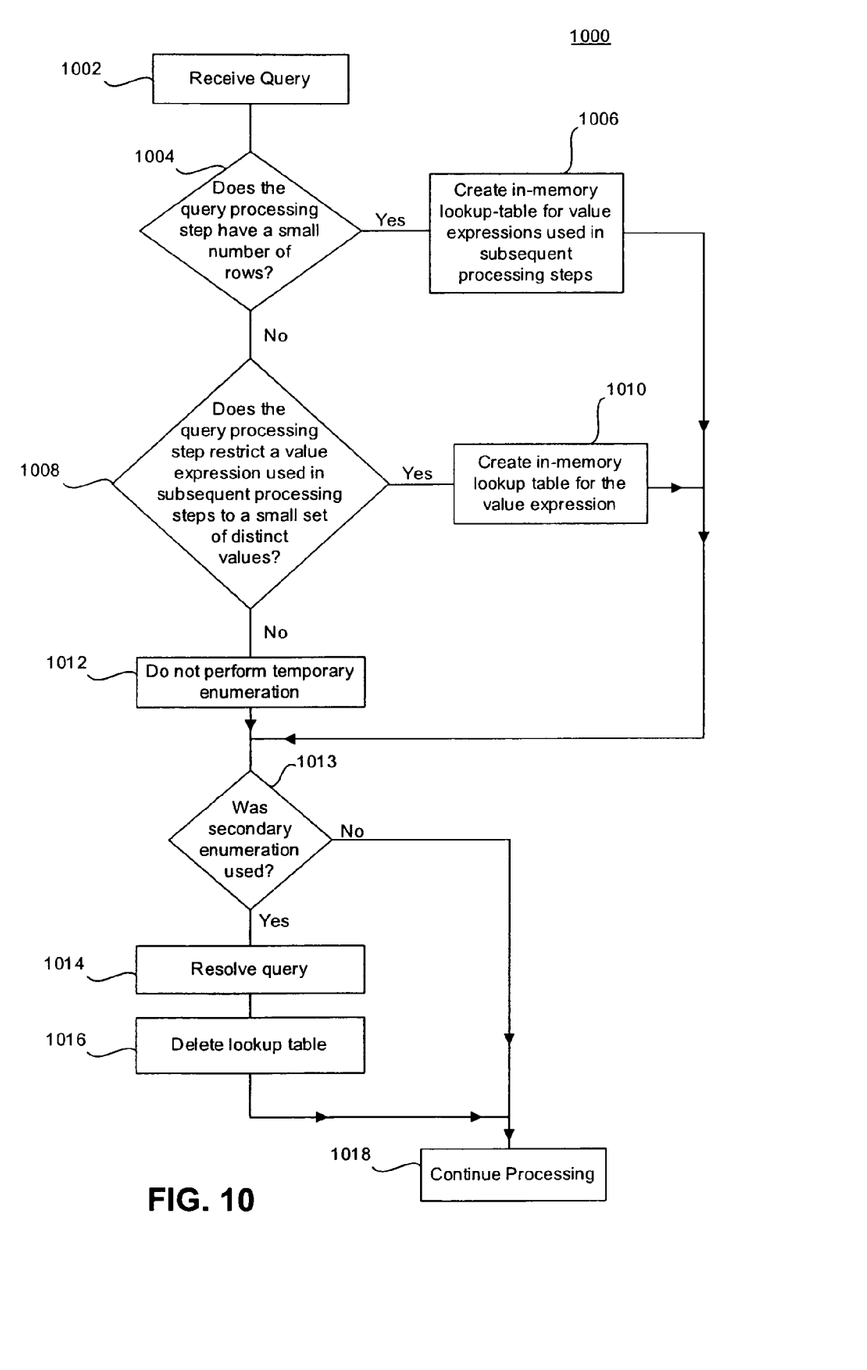
FIG. 10 is a flowchart illustrating the steps for performing temporary enumeration, in accordance with an embodiment of the present invention.

FIG. 10 includes a flowchart 1000 which illustrates the steps by which a temporary enumeration is created, in accordance with an embodiment of the present invention. At step 1002, a query processing step within a query is started. At step 1004, it is determined whether the column or value expression on which the query processing step is being performed has a sufficiently small number of distinct values. If so, at step 1006, an in-memory lookup-table is created for the columns or value expressions used in the query processing step, the in-memory lookup-table mapping ordinals of a temporary enumeration to columns or value expressions in the query processing step. Otherwise, at step 1008, it is determined whether the query processing step restricts a column or value expression that has been directly or indirectly filtered to a small set of distinct values. If not, at step 1012, it is determined that a temporary enumeration would not be helpful, in accordance with an additional embodiment of the present invention.

If the column does have a small set of distinct values, then an in-memory lookup-table is created for the column or other value expression at step 1010, in accordance with an embodiment of the present invention. The in-memory lookup-table maps ordinals of a temporary enumeration to the column. At step 1013, if secondary enumeration was not used, processing continues to step 1018. If secondary enumeration was used, at step 1014, the query processing step is resolved using the enumeration values from the temporary enumeration to perform any necessary computations. With the query resolved, the lookup-table, and accordingly the temporary enumeration, is deleted at step 1016. Processing continues at step 1018.

One skilled in the relevant art will appreciate that the steps shown in flowchart 1000 need not be performed in the order depicted.

The present invention also includes an embodiment for the usage of temporary enumeration with the techniques described in Section 3. For example, if it is determined that the temporary enumeration is not semantically equivalent to the column data values, a secondary enumeration is created that is semantically equivalent to the column data values. This secondary enumeration is then used in resolving a query processing step. Likewise, the techniques described in Section 2 may be applied when using temporary enumeration. The present invention also includes embodiments for using the techniques described in Sections 2-4 in any combination.

5. Example Computer System Implementation

Figure 11:
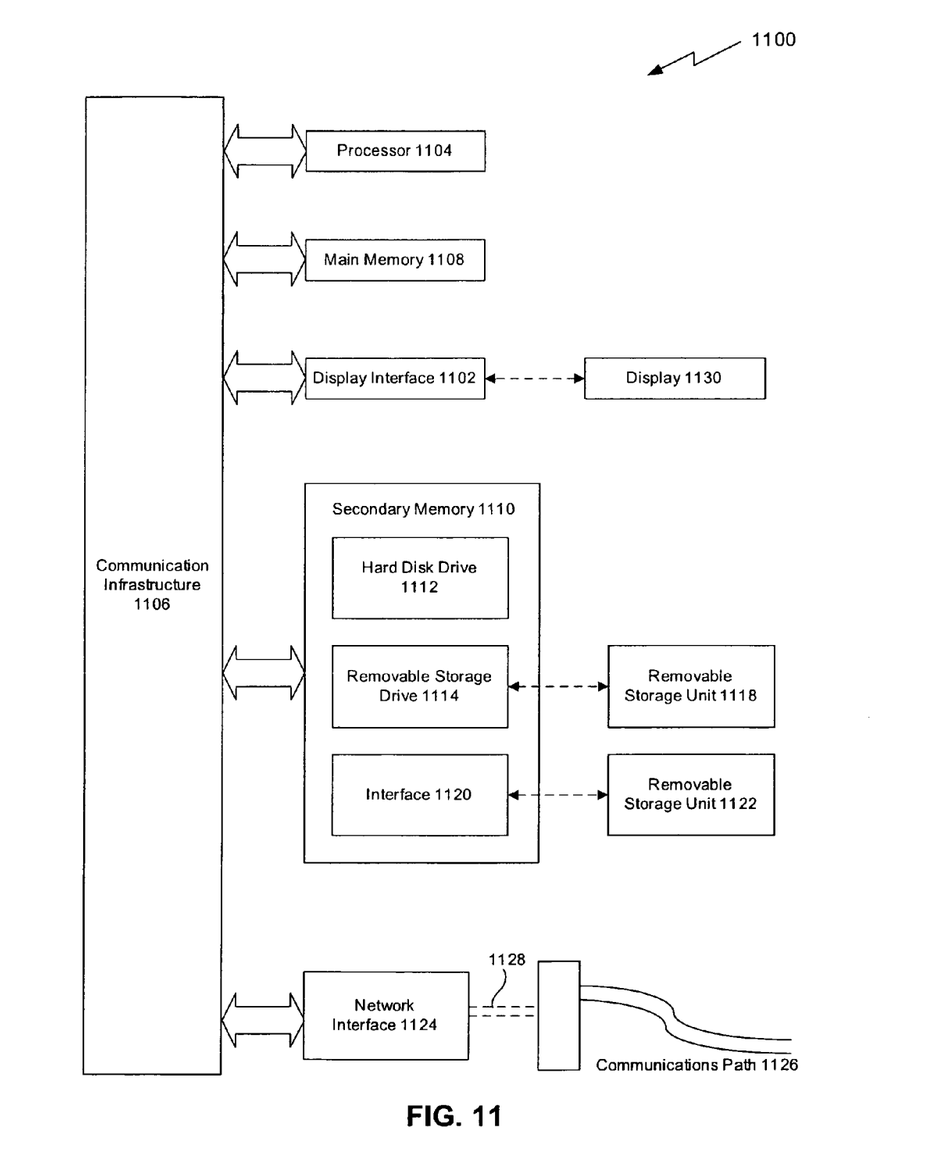
FIG. 11 depicts an example computer system in which the present invention may be implemented.

Various aspects of the present invention can be implemented by software, firmware, hardware, or a combination thereof. FIG. 11 illustrates an example computer system 1100 in which the present invention, or portions thereof, can be implemented as computer-readable code. For example, the method illustrated by flowchart 300 of FIG. 3 can be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus or network).

Computer system 1100 also includes a main memory 1108, preferably random access memory (RAM), and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, a hard disk installed in hard disk drive 1112, and signals carried over communications path 1126. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the method illustrated by flowchart 300 of FIG. 3 discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

7. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
receiving a query that references a column within a table, wherein a column cell from the column contains an enumeration value, and wherein the column is associated with a lookup-table configured to translate the enumeration value into a column cell value corresponding to the column cell;
generating a set of query processing steps that, when executed by one or more processors, provides a query result to the query;
passing a projection of the column containing the enumeration value to a query processing step from the set of query processing steps;
determining, prior to executing the query processing step, that a partial result that is generated within the query processing step using the enumeration value instead of the column cell value does not change the partial result;
executing, in response to the determination that the partial result does not change, the query processing step using the enumeration value to produce the partial result; and
delaying, in response to the determination that the partial result does not change, a translation of the enumeration value into the column cell value during execution of the set of query processing steps by passing the projection of the column containing the enumeration value to a subsequent query processing step from the set of query processing steps, wherein the translation is delayed until determining that a subsequent partial result that is generated within the subsequent processing step using the enumeration value is different from the subsequent partial result generated using the column value.

2. The method of claim 1, wherein the enumeration value is within a set of values defined by a data type.

3. The method of claim 1, wherein the column cell is located within the column comprising additional column cells, each additional column cell containing an additional enumeration value, wherein the lookup-table is further configured to translate the additional enumeration value into an additional column cell value corresponding to the additional column cell.

4. The method of claim 1, wherein the first query processing step is an earliest executed query processing step of the set of query processing steps that references the column.

5. The method of claim 1, wherein the passing comprises:
associating the enumeration value with an instance of a first evaluable class; and
defining the lookup-table as an instance of a second evaluable class.

6. The method of claim 1, further comprising:
determining, prior to executing a next processing step from the set of processing steps, that a next partial result that is generated within the next query processing step using the enumeration value instead of the column cell value changes the next partial result, wherein the determination that the next partial result does change is performed based on the next query processing step, a data type of the column cell value, and a role of the column within the next query processing step;
translating, in response to the determination that the next partial result does change, the enumeration value into the column cell value using the lookup table; and
executing, in response to the determination that the next partial result does change, the next query processing step using the column cell value to produce the next partial result.

7. The method of claim 6, wherein the translating the enumeration value into the column cell value using the lookup table comprises:
retrieving the column cell value from the lookup-table using the enumeration value as a key.

8. A non-transitory computer-readable storage medium having instructions stored thereon that, when executed by a computing device, cause the computing device to perform a method comprising:
receiving a query that references a column within a table, wherein a column cell from the column contains an enumeration value, and wherein the column is associated with a lookup-table configured to translate the enumeration value into a column cell value corresponding to the column cell;

generating a set of query processing steps that, when executed, provides a query result to the query;

passing a projection of the column containing the enumeration value to a query processing step from the set of query processing steps;

determining, prior to executing the query processing step, that a partial result that is generated within the query processing step using the enumeration value instead of the column cell value does not change the partial result;

executing, in response to the determination that the partial result does not change, the query processing step using the enumeration value to produce the partial result; and delaying, in response to the determination that the partial result does not change, a translation of the enumeration value into the column cell value during execution of the set of query processing steps by passing the projection of the column containing the enumeration value to a subsequent query processing step from the set of query processing steps, wherein the translation is delayed until determining that a subsequent partial result that is generated within the subsequent processing step using the enumeration value is different from the subsequent partial result generated using the column value.

9. The non-transitory computer-readable storage medium of claim 8, wherein the enumeration value is within a set of values defined by a data type.

10. The non-transitory computer-readable storage medium of claim 8, wherein the column cell is located within the column comprising additional column cells, each additional column cell containing an additional enumeration value, wherein the lookup-table is further configured to translate the additional enumeration value into an additional column cell value corresponding to the additional column cell.

11. The non-transitory computer-readable storage medium of claim 8, wherein the first query processing step is an earliest executed query processing step of the set of query processing steps which reference the column cell.

12. The non-transitory computer-readable storage medium of claim 8, wherein the passing comprises:
associating the enumeration value with an instance of a first evaluable class; and
defining the lookup-table as an instance of a second evaluable class.

13. The non-transitory computer-readable storage medium of claim 8, wherein the method further comprises:
determining, prior to executing a next processing step from the set of processing steps, that a next partial result generated within the next query processing step using the enumeration value instead of the column cell value changes the next partial result, wherein the determination that the next partial result does change is performed based on a type of the next query processing step, a data type of the column cell value, and a role of the column within the next query processing step;
translating, in response to the determination that the next partial result does change, the enumeration value into the column cell value using the lookup table; and
executing, in response to the determination that the next partial result does change, the next query processing step using the column cell value to produce the next partial result.

14. The non-transitory computer-readable storage medium of claim 13, wherein the translating the enumeration value into the column cell value using the lookup table comprises: retrieving the column cell value from the lookup-table using the enumeration value as a key.

15. A system, comprising:
a processor; and
a memory to store instructions, wherein the instructions are executed by the processor to perform operations comprising:
receiving a query that references a column within a table, wherein a column cell from the column contains an enumeration value, and wherein the column is associated with a lookup-table configured to translate the enumeration value into a column cell value corresponding to the column cell,
generating a set of query processing steps that, when executed, provides a query result to the query,
passing a projection of the column containing the enumeration value to a query processing step from the set of query processing steps,
determining that a partial result that is generated within the query processing step using the enumeration value instead of the column cell value does not change the partial result,
executing, in response to the determination that the partial result does not change, the query processing step using the enumeration value to produce the partial result, and
delaying, in response to the determination that the partial result does not change, a translation of the enumeration value into the column cell value during execution of the set of query processing steps by passing the projection of the column containing the enumeration value to a subsequent query processing step from the set of query processing steps, wherein the translation is delayed until determining that a subsequent partial result that is generated within the subsequent processing step using the enumeration value is different from the subsequent partial result generated using the column value.

16. The system of claim 15, wherein the column cell is located within the column comprising additional column cells, each additional column cell containing an additional enumeration value, wherein the lookup-table is further configured to translate the additional enumeration value into an additional column cell value corresponding to the additional column cell.

17. The system of claim 15, wherein the first query processing step is an earliest executed query processing step of the set of query processing steps which reference the column cell.

18. The system of claim 15, wherein the passing comprises:
associating the enumeration value with an instance of a first evaluable class; and
defining the lookup-table as an instance of a second evaluable class.

19. The system of claim 15, the operations further comprising:
determining, prior to executing a next processing step from the set of processing steps, that a next partial result that is generated within the next query processing step using the enumeration value instead of the column cell value changes the next partial result, wherein the determination that the next partial result does change is performed based on a type of the next query processing step, a data type of the column cell value, and a role of the column within the next query processing step;

translating, in response to the determination that the second partial result does change, the enumeration value into the column cell value using the lookup table; and executing, in response to the determination that the next partial result does change, the next query processing step using the column cell value to produce the next partial result.

\* \* \* \* \*